US010527305B2

(12) United States Patent
Lin et al.

(10) Patent No.: US 10,527,305 B2
(45) Date of Patent: Jan. 7, 2020

(54) HVAC VENTILATION AIR FLOW POWERED SMART VENT

(71) Applicant: Vivint, Inc., Provo, UT (US)

(72) Inventors: Rongbin Lanny Lin, Draper, UT (US); Brandon Bunker, Highland, UT (US); Shiwei Liu, Lehi, UT (US)

(73) Assignee: Vivint, Inc., Provo, UT (US)

( * ) Notice: Subject to any disclaimer, the term of this patent is extended or adjusted under 35 U.S.C. 154(b) by 51 days.

(21) Appl. No.: 15/408,078

(22) Filed: Jan. 17, 2017

(65) Prior Publication Data

US 2018/0202674 A1 Jul. 19, 2018

(51) Int. Cl.
| | | |
|---|---|---|
| *F24F 11/30* | (2018.01) | |
| *F24F 11/62* | (2018.01) | |
| *G05B 19/042* | (2006.01) | |
| *F24F 11/63* | (2018.01) | |
| *F24F 110/10* | (2018.01) | |
| *F24F 110/20* | (2018.01) | |
| *F24F 110/50* | (2018.01) | |
| *F24F 120/10* | (2018.01) | |
| *F24F 110/40* | (2018.01) | |
| *F24F 130/30* | (2018.01) | |
| *F24F 11/58* | (2018.01) | |

(52) U.S. Cl.
CPC ............ *F24F 11/30* (2018.01); *F24F 11/62* (2018.01); *G05B 19/042* (2013.01); *F24F 11/58* (2018.01); *F24F 11/63* (2018.01); *F24F 2110/10* (2018.01); *F24F 2110/20* (2018.01); *F24F 2110/40* (2018.01); *F24F 2110/50* (2018.01); *F24F 2120/10* (2018.01); *F24F 2130/30* (2018.01); *G05B 2219/2614* (2013.01)

(58) Field of Classification Search
CPC ........ F24F 11/0001; F24F 11/62; F24F 11/30; F24F 2110/10; F24F 11/0012; F24F 11/006; F24F 11/63; F24F 2011/0061

USPC ......................................................... 700/278
See application file for complete search history.

(56) References Cited

U.S. PATENT DOCUMENTS

| | | |
|---|---|---|
| 5,251,815 A | 10/1993 | Foye |
| 5,449,319 A | 9/1995 | Dushane et al. |

(Continued)

OTHER PUBLICATIONS

Gerhart, R. et al., "HVAC Monitoring System," University of Akron, Honors Research Projects, Paper 280, Apr. 22, 2016, http://ideaexchange.uakron.edu/cgi/viewcontent.cgi?article=1315&context=honors_research_projects.

(Continued)

*Primary Examiner* — Brian W Wathen
*Assistant Examiner* — Christopher W Carter
(74) *Attorney, Agent, or Firm* — Holland & Hart LLP

(57) ABSTRACT

Techniques are described for generating power from airflow powered smart vents associated with security and automation systems. One method includes monitoring a rate of airflow through an air vent in a centralized heating and cooling system, generating, at a sensor at the air vent, power based at least in part on the rate of airflow through the air vent, storing the generated power in the sensor at the air vent, providing the stored power to one or more motors associated with the sensor at the air vent, and utilizing the stored power to perform communication between the sensor at the air vent and a control panel of the home automation system, wherein the control panel is located at a location different from a location of the sensor.

20 Claims, 8 Drawing Sheets

(56) References Cited

U.S. PATENT DOCUMENTS

| | | | |
|---|---|---|---|
| 7,802,618 B2 | 9/2010 | Simon et al. | |
| 8,249,731 B2 | 8/2012 | Tran et al. | |
| 8,271,806 B1 * | 9/2012 | Xiao | G06F 1/263 |
| | | | 713/300 |
| 9,618,222 B1 * | 4/2017 | Hussain | F24F 11/30 |
| 2005/0151511 A1 * | 7/2005 | Chary | G06F 1/263 |
| | | | 320/127 |
| 2007/0178825 A1 | 8/2007 | Aronstam et al. | |
| 2008/0033599 A1 * | 2/2008 | Aminpour | F24F 11/30 |
| | | | 700/276 |
| 2008/0188174 A1 | 8/2008 | Aminpour et al. | |
| 2013/0043738 A1 * | 2/2013 | Park | H04M 1/7253 |
| | | | 307/104 |
| 2015/0369504 A1 | 12/2015 | Flaherty et al. | |
| 2016/0377305 A1 | 12/2016 | Kwa | |

OTHER PUBLICATIONS

Federspiel, C. et al., "Air-powered Sensor," Controls and Information Technology, Center for the Built Environment, Center for Environmental Design Research, UC Berkeley, Jan. 1, 2003, http://escholarship.org/uc/item/6cx4c9nf.

PCT International Search Report and Written Opinion for International Application No. PCT/US2018/012989, dated Apr. 26, 2018 (15 pp.).

* cited by examiner

HVAC VENTILATION AIR FLOW POWERED SMART VENT

BACKGROUND

The present disclosure, for example, relates to security and automation systems, and more particularly to providing techniques for generating power from airflow powered smart vents associated with security and automation systems.

Security and automation systems are widely deployed to provide various types of communication and functional features such as monitoring, communication, notification, and/or others. These systems may be capable of supporting generation of power from airflow powered smart vents.

A smart home environment calls for multiple smart home actuators/sensors located at different areas within a home. One common problem with smart home actuators/sensors is an efficient method to power the devices. In some examples, smart home actuators/sensors include but are not limited to small motors or sensors for detecting motion, audio, temperature, humidity, WiFi, Bluetooth, light conditions, etc. Current smart home systems mostly use these following methods to power sensors and actuators: (a) a method where smart home actuators/sensors are plugged into a direct power source; (b) battery power; and (c) solar power. A direct power source requires wiring for power. In the example of battery power, it is troublesome to monitor battery power level within the sensors and to change batteries when needed. In the example of solar power, the smart home sensors require access to direct sunlight in order to function properly. Therefore, there exists a need for a method to effectively power sensors and actuators within a smart home environment.

SUMMARY

The present disclosure addresses the shortcomings of existing security and automation systems. In some aspects, the present disclosure, relates to providing techniques for generating power from airflow powered smart vents associated with security and automation systems.

A method for generating power from airflow powered smart vents is described. The method may include monitoring a rate of airflow through an air vent in a centralized heating and cooling system; generating, at a sensor at the air vent, power based at least in part on the rate of airflow through the air vent; and storing the generated power in the sensor at the air vent.

An apparatus for generating power from airflow powered smart vents is described. The apparatus may include a processor, memory in electronic communication with the processor, and instructions stored in the memory. The instructions may cause the processor to monitor a rate of airflow through an air vent in a centralized heating and cooling system; generate, at a sensor at the air vent, power based at least in part on the rate of airflow through the air vent; and store the generated power in the sensor at the air vent.

A non-transitory computer readable medium for generating power from airflow powered smart vents is described. The non-transitory computer readable medium may store a program that, when executed by a processor, causes the processor to monitor a rate of airflow through an air vent in a centralized heating and cooling system; generate, at a sensor at the air vent, power based at least in part on the rate of airflow through the air vent; and store the generated power in the sensor at the air vent.

Some embodiments of the method, apparatus, and/or non-transitory computer-readable medium may further include processes, features, means, and/or instructions for: providing the stored power to one or more motors associated with the sensor at the air vent, and utilizing the stored power to perform communication between the sensor at the air vent and a control panel of the home automation system, wherein the control panel is located at a location different from a location of the sensor. In some embodiments of the method, apparatus, and/or non-transitory computer-readable medium may further include processes, features, means, and/or instructions for: monitoring a level associated with the power stored in the sensor, and determining whether the level associated with the power satisfies a predetermined threshold.

Some embodiments of the method, apparatus, and/or non-transitory computer-readable medium may further include processes, features, means, and/or instructions for: in response to the level not satisfying the predetermined threshold, adjusting an opening angle of one or more air vents in the centralized heating & cooling system to increase the rate of airflow through the one or more air vents. In some embodiments of the method, apparatus, and/or non-transitory computer-readable medium may further include processes, features, means, and/or instructions for: in response to the level not satisfying the predetermined threshold, adjusting at least one of a fan of the centralized heating & cooling system and a thermostat level associated with the home automation system to increase the rate of airflow through one or more air vents in the centralized heating & cooling system.

In some embodiments of the method, apparatus, and/or non-transitory computer-readable medium described above, the sensor at the air vent includes at least one of a motion sensor, a camera sensor, a shock sensor, a proximity sensor, an appliance sensor, a temperature sensor, a humidity sensor, a light beam sensor, a smoke sensor, a glass break sensor, and a carbon monoxide sensor. Some embodiments of the method, apparatus, and/or non-transitory computer-readable medium may further include processes, features, means, and/or instructions for: storing the generated power in one or more rechargeable batteries associated with the sensor at the air vent.

Some embodiments of the method, apparatus, and/or non-transitory computer-readable medium may further include processes, features, means, and/or instructions for: using one or more sensors at the air vent to determine whether a home is occupied, and adjusting the one or more sensors at the air vent to a conservation level in response to determining that the home has no occupancy.

Some embodiments of the method, apparatus, and/or non-transitory computer-readable medium may further include processes, features, means, and/or instructions for: generating a schedule reflecting occupancy of the home, and adjusting the one or more sensors at the air vent to a conservation level based at least in part on the schedule.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The techniques described herein generally relate to addressing the shortcomings of existing security and automation systems. In one aspect, the techniques described herein relate to generating power from airflow powered smart vents associated with security and automation systems. A heating ventilation and air conditioning (HVAC) system naturally uses air flow to move hot/cold air around to maintain desired temperature within a home. The air flow of the HVAC system through air vents may be used to power smart home sensors and actuators. The power may be stored directly at the vent register using a rechargeable batteries. This allows generating and storing power at the air vents, when there is airflow through the air vents. The stored power may constantly be used to provide power to a motor and a suite of smart home sensors and also to power the communication from smart home sensors to the hub of the smart home. This avoids running power wire to the vent register or the need to change battery frequently. The harnessed power allows the air vent (i.e., using one or more sensors located at/near the HVAC air vent) to measure room conditions (such as temperature condition, humidity condition, light condition, occupancy, etc.) and then adjust vent opening angle based on smart home intelligence.

In one example, a home automation system may monitor a rate of airflow through an air vent in a centralized heating & cooling system. The home automation system may then generate power based at least in part on the rate of airflow through the air vent. In some cases, the home automation system may generate the power at one or more sensors present at the air vent (e.g., temperature sensor, occupancy sensor, motion sensor, humidity sensor, light condition sensor, etc.). In some cases, the home automation system may store the generated power in the sensor at the air vent. For example, the system may store the generated power in one or more rechargeable batteries associated with the sensors located at the air vent.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
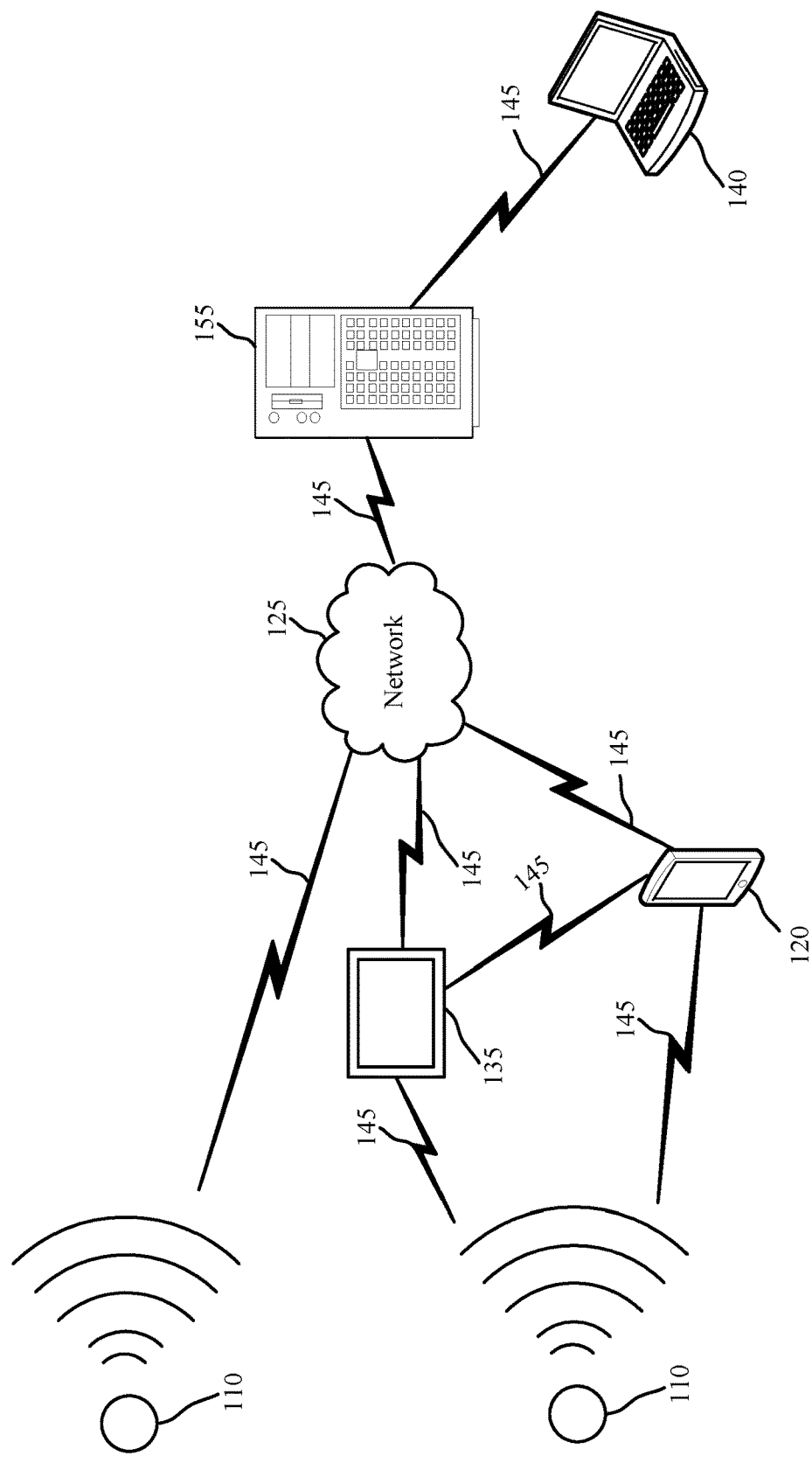
FIG. 1 shows a block diagram relating to an example security and automation system, in accordance with one or more aspects of the present disclosure.

FIG. 1 shows a block diagram relating to an example security and automation system 100, in accordance with one or more aspects of the present disclosure. The security and automation system 100 may include one or more sensor units 110, local computing device 120, control panel 135, remote computing device 140, and server 155. The network 125 may provide user authentication credentials, encryption, access authorization, tracking, Internet Protocol (IP) connectivity, and other access, computation, modification, and/or functions. The control panel 135 may interface with the network 125 through a first set of wired and/or wireless communication links 145 to communicate with the server 155. The control panel 135 may perform communication configuration, adjustment, and/or scheduling for communication with the local computing device 120 and remote computing device 140, or may operate under the control of a controller. Control panel 135 may communicate with a back end server (such as the server 155)—directly and/or indirectly—using the first set of one or more wireless communication links 145. In some examples, the server 155 may be a remote server located at a location different or same from the control panel 135, the local computing device 120, and/or the remote computing device 140.

The control panel 135 may wirelessly communicate with the remote computing device 140 and the local computing device 120 by way of one or more antennas. The control panel 135 may provide communication coverage for a respective coverage area (e.g., residential, commercial). In some examples, control panel 135 may be referred to as a control device, a controller, a base transceiver station, a radio base station, an access point, a radio transceiver, or some other suitable terminology. The coverage area for a control panel 135 may be divided into sectors making up only a portion of the coverage area. The security and automation system 100 may include control panels of different types. In some examples, the security and automation system 100 may include overlapping coverage areas for one or more different parameters, including different technologies, features, subscriber preferences, hardware, software, technology, and/or methods. For example, one or more control panels may be related to one or more discrete structures (e.g., a home, a business) and each of the one more discrete structures may be related to one or more discrete areas. In other examples, multiple control panels may be related to the same one or more discrete structures (e.g., multiple control panels relating to a home and/or a business complex). For example, one or more control panels may be located within a home. Additionally or alternatively, each room within the home may have a designated control panel located within each room. In some cases, the one or more control panels may communicate with one another via one or more communication protocols. In some examples, the one or more control panels may form a mesh network within the home and communicate with one another via the mesh network. In some examples, a control panel may modify or update a security parameter based on information received from one or more other control panels in the mesh network.

The local computing device 120 or remote computing device 140 may be dispersed throughout the security and automation system 100. In some examples, the local computing device 120 and/or remote computing device 140 may be stationary and/or mobile. In some examples, the local computing device 120 and/or remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. The local computing device 120 and/or remote computing device 140 may, additionally or alternatively, include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, control panel 135 may be a smart home system panel, for example, an interactive panel mounted on a wall or other surface in a person's home. Control panel 135 may be in direct communication via wired or wireless communication links 145 with the one or more sensor units 110, or may receive sensor data from the one or more sensor units 110 via local computing device 120 and network 125, or may receive data via remote computing device 140, server 155, and network 125. Additionally or alternatively, the control panel 135 may wirelessly communicate with the sensor units 110 via one or more antennas. The sensor units 110 may be dispersed throughout the security and automation system 100 and each sensor unit 110 may be stationary and/or mobile. Sensor units 110 may include and/or be one or more sensors that sense: proximity, motion, temperatures, humidity, sound level, smoke, structural features (e.g., glass breaking, window position, door position), time, light, geo-location data of a user and/or a device, distance, biometrics, weight, speed, height, size, preferences, light, darkness, weather, time, system performance, and/or other inputs that relate to a security and/or an automation system. The local computing device 120, remote computing device 140, and/or a sensor units 110 may be able to communicate through one or more wired and/or wireless connections with various components such as a control panel, base stations, and/or network equipment (e.g., servers, wireless communication points, etc.) and/or the like. In some examples, one or more sensor units 110 may be located within a structure, e.g., home. Additionally or alternatively, in some examples, the structure may have a designated sensor unit located within one or more predetermined areas, e.g., rooms. Additionally or alternatively, in some examples, one or more sensor units 110 may be located at or near an air vent in a centralized heating and cooling system. In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control panels.

The wireless communication links 145 shown in the security and automation system 100 may include uplink (UL) transmissions from a local computing device 120 to a control panel 135, and/or downlink (DL) transmissions, from a control panel 135 to the local computing device 120. The downlink transmissions may also be called forward link transmissions while the uplink transmissions may also be called reverse link transmissions. Wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The wireless communication links 145 may transmit bidirectional communications and/or unidirectional communications. Wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some aspects, of the security and automation system 100, control panel 135, local computing device 120, and/or remote computing device 140 may include one or more antennas for employing antenna diversity schemes to improve communication quality and reliability between control panel 135, local computing device 120, and remote computing device 140. Additionally or alternatively, control panel 135, local computing device 120, and/or remote computing device 140 may employ multiple-input, multiple-output (MIMO) techniques that may take advantage of multi-path, mesh-type environments to transmit multiple spatial layers carrying the same or different coded data.

While the local computing device 120 and/or remote computing device 140 may communicate with each other through the control panel 135 using wireless communication links 145, the local computing device 120 and/or remote computing device 140 may also communicate directly with one or more other devices via one or more direct communication links (not shown). Examples of direct communication links may include Wi-Fi Direct, BLUETOOTH®, wired, and/or, and other P2P group connections. The control panel 135, local computing device 120, and/or remote computing device 140 in these examples may communicate according to the WLAN radio and baseband protocol including physical and medium access control (MAC) layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within security and automation system 100.

In an example, local computing device 120 and remote computing device 140 may be custom computing entities configured to interact with sensor units 110 via network 125, and in some embodiments, via server 155. In other embodiments, local computing device 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. The local computing device 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing device 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some embodiments, the output may be an integral component of the local computing device 120. Similarly, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some embodiments, the sensor units 110 may be sensors configured to monitor a rate of airflow through an air vent. In some examples, the sensor units 110 may be sensors configured to conduct periodic or ongoing automatic measurements related to detecting an occurrence of an event (e.g., detecting occupancy of a person in a home). In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some embodiments, the same sensor unit 110) may detect an occupancy of and/or location of the person.

In some embodiments, the sensor units 110 may be separate from the control panel 135 and may be positioned at various locations throughout the house or the property. In some embodiment, the sensor units 110 may be positioned at or near an air vent of a centralized heating and cooling system. In other embodiments, the sensor units 110 may be integrated or collocated with other house and/or building automation system components, home appliances, air vents, and/or other building fixtures. For example, a sensor unit 110 may be integrated with the opening of an air vent. In other embodiments, a sensor unit 110 may be integrated with a doorbell or door intercom system, or may be integrated with a front entrance light fixture. In other embodiments, a sensor unit 110 may be integrated with a wall outlet and/or switch. In other embodiments, the sensor units 110 may be integrated and/or collocated with the control panel 135 itself. In some examples, each of the sensor units 110, control panel 135, and/or local computing device 120 may comprise a speaker unit, a microphone unit, and/or a camera unit, among other things.

In some cases, a property may be monitored by the control panel 135 and/or sensor units 110. In some examples, the control panel 135 may include sensor units 110 such that the control panel 135 may directly receive signals (e.g., air flow detected, power generated, power stored, motion sensed, entry/exit detected) associated with the property. Each sensor unit 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example by monitoring heartbeat or breathing. In some examples, occupancy may be detected by any one of a motion sensor, audio sensor, RFID sensor, video camera, light-break sensor, or a combination thereof. In some embodiments, the sensor units 110 may be separate from the control panel 135, and may be positioned at various locations, also referred to herein as zones, throughout a property. In other embodiments, the sensor units 110 may be integrated or collocated with other security and automation system components. For example, a sensor unit 110 may be integrated with a wall, door, window for detecting entry and/or exit of a person relative to the property. In other embodiments, the sensor units 110 may be integrated or collocated with the control panel 135 itself.

In some embodiments, data gathered by the sensor units 110 may be communicated to local computing device 120, which may be a thermostat or other wall-mounted input/output smart home display. In other embodiments, local computing device 120 may be a personal computer or smart phone. Where local computing device 120 is a smart phone, the smart phone may have a dedicated application directed to transmitting a request to activate or deactivate a security function of the security and automation system 100. In some embodiments, local computing device 120 may communicate with remote computing device 140 or control panel 135 via network 125 and server 155. Examples of network 125 may include cloud networks, LAN, WAN, virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 120 from remote computing device 140. For example, in some embodiments, remote computing device 140 may include a mobile application that interfaces with one or more functions of local computing device 120 or control panel 135.

The server 155 may be configured to communicate with the sensor units 110, the local computing device 120, the remote computing device 140 and control panel 135. The server 155 may perform additional processing on signals received from the sensor units 110 or local computing device 120, or may simply forward the received information to the remote computing device 140 and control panel 135. Additionally or alternatively, server 155 may be a computing device operable to receive data streams (e.g., from sensor units 110 and/or local computing device 120 or remote computing device 140), store and/or process data, and/or transmit data and/or data summaries (e.g., to remote computing device 140). For example, server 155 may receive identification data from a sensor unit 110 and location data from the same and/or different sensor units 110. In some embodiments, server 155 may "pull" the data (e.g., by querying the sensor units 110, the local computing device 120, and/or the control panel 135). In some embodiments, the data may be "pushed" from the sensor units 110 and/or the local computing device 120 to the server 155. For example, the sensor units 110 and/or the local computing device 120 may be configured to transmit data as it is generated by or entered into that device. In some instances, the sensor units 110 and/or the local computing device 120 may periodically transmit data (e.g., as a block of data or as one or more data points).

The server 155 may include a database (e.g., in memory) containing location, identification and/or authentication data received from the sensor units 110 and/or the local computing device 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
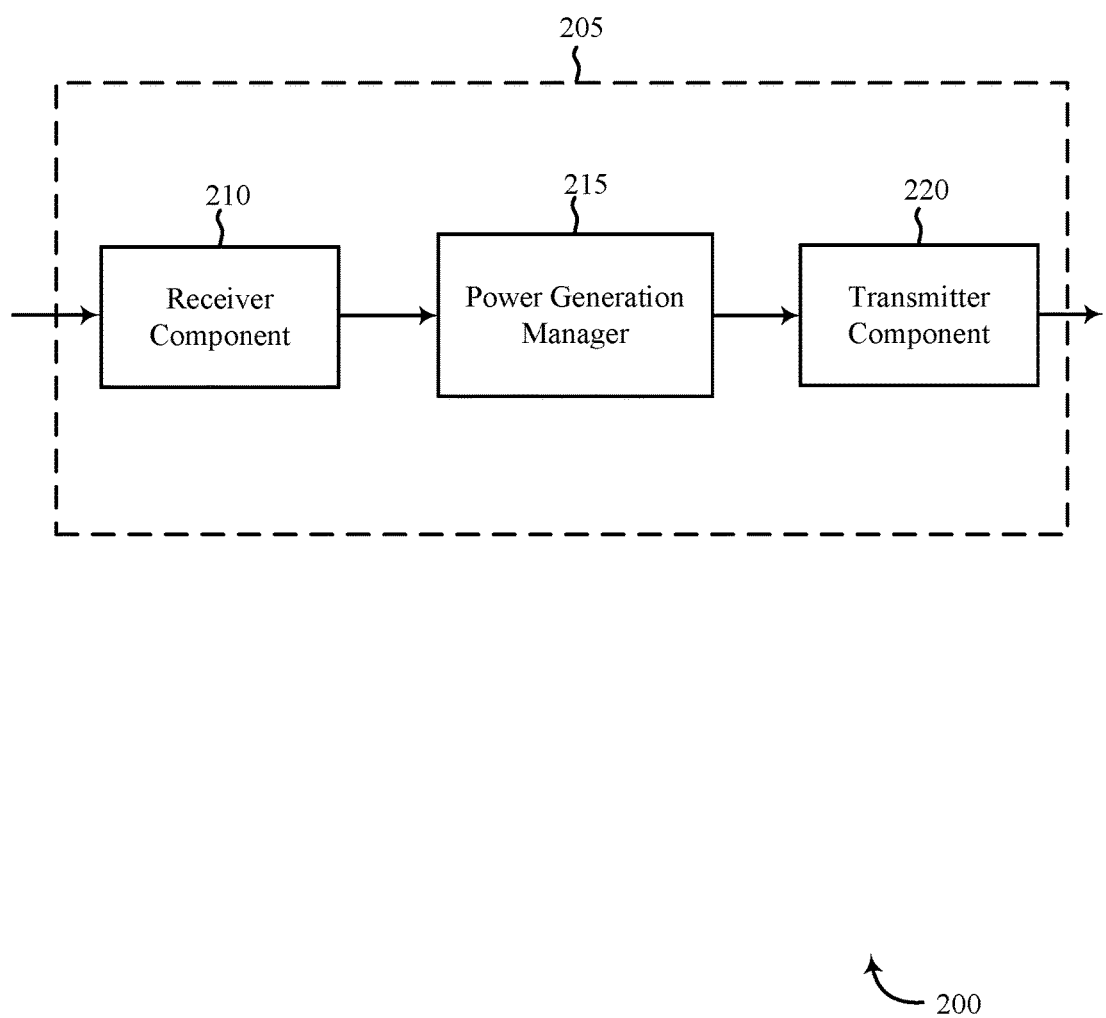
FIG. 2 shows a block diagram of an example apparatus relating to a security and automation system, in accordance with one or more aspects of the present disclosure.

FIG. 2 shows a block diagram 200 of an example apparatus 205 relating to a security and automation system, in accordance with one or more aspects of the present disclosure. The apparatus 205 may be an example of one or more aspects of a control panel 135 described with reference to FIG. 1. The apparatus 205 may include a receiver component 210, a power generation manager 215, and/or a transmitter component 220. The apparatus 205 may also be or include a processor. Each of these components or modules may be in communication with each other—directly and/or indirectly.

In one embodiment, where apparatus 205 is a control panel, apparatus 205 may be a control panel in the form of an interactive home automation system display. In some embodiments, apparatus 205 may be a local computing device 120 such as a personal computer or portable electronic device (e.g., smart phone, smart watch, tablet computer). In one embodiment, apparatus 205 may be a smart vent associated with a home automation system. In one embodiment, apparatus 205 may be a smart air vent in a centralized heating and cooling system (e.g., HVAC system) associated with a home automation system. In some embodiments, apparatus 205 may be coupled to at least one sensor unit 110. In one embodiment, apparatus 205 may be a smart vent coupled with at least one sensor unit 110.

The components of the apparatus 205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented—in whole or in part—with instructions embodied in memory formatted to be executed by one or more general and/or application-specific processors.

The receiver component 210 may receive information such as packets, user data, and/or control information associated with various information channels (e.g., control channels, data channels, etc.). In some examples, the receiver component 210 may be configured to receive instructions at the apparatus 205. In one aspect, the receiver component 210 may be configured to receive an instruction from local computing device 120 and/or remote computing device 140. In some examples, the received instruction may be in the form of a verbal command and/or a tactile input. In further examples, the receiver component 210 may receive airflow information, stored power information, user identification information and/or occupancy information from the sensor units 110, local computing device 120, remote computing device 140, and/or server 155. In some examples, information (e.g., airflow information, stored power information, user identification information, occupancy information) may be passed on to the power generation manager 215, and to other components of the apparatus 205.

The power generation manager 215 may generate power from HVAC ventilation air flow powered smart vents associated with security and automation systems. In some cases, a property may comprise of one or more sensor units 110 located at or near at least one smart vent in a centralized heating and cooling system. In some cases, airflow through the smart vent may be monitored by the apparatus 205. In such examples, the apparatus 205 may be located at or near the one or more sensor units 110. In some examples, the apparatus 205 may include sensor units 110 such that the apparatus 205 may directly receive signals (e.g., rate of airflow) associated with the smart vent in the centralized heating and cooling system associated with the home automation system. Apparatus 205 may additionally, individually or in combination with other sensor units, monitor a rate of airflow through at least one air vent (e.g., smart vent) and/or monitor power stored at the at least one air vent. For example, apparatus 205 may be located at or near at least one smart vent, and the apparatus 205 may include a sensor unit 110, such as a motion sensor, a camera sensor, a shock sensor, a proximity sensor, an appliance sensor, a temperature sensor, a humidity sensor, a light beam sensor, a smoke sensor, a glass break sensor, and a carbon monoxide sensor. In some cases, the property may additionally or alternatively be monitored by the apparatus 205 and/or in conjunction with the sensor units 110. In some examples, the apparatus 205 may include sensor units 110 such that the apparatus 205 may directly receive signals (e.g., motion sensed, entry/exit detected, time when last motion sensed) associated with the property. Apparatus 205 may additionally, individually or in combination with other sensor units, monitor separate and/or multiple occupancy parameters. In some embodiments, the sensor units 110 may be separate from the apparatus 205, and may be positioned at various locations or zones throughout a property. Additionally or alternatively, the apparatus 205 may be coupled with at least one sensor unit 110.

In some cases, the power generation manager 215 may be in communication with the sensor units 110. The power generation manager 215 may monitor a rate of airflow through an air vent in a centralized heating and cooling system. In some examples, the power generation manager 215 may be a part of a home automation system. For example, in conjunction with at least one sensor unit 110, the power generation manager 215 may monitor a rate of flow of air through a smart air vent (e.g., airflow through a vent of an HVAC system). In some examples, the at least one sensor unit 110 may include at least one of a motion sensor, a camera sensor, a shock sensor, a proximity sensor, an appliance sensor, a temperature sensor, a humidity sensor, a light beam sensor, a smoke sensor, a glass break sensor, and a carbon monoxide sensor. The power generation manager 215 may generate at a sensor (e.g., sensor unit 110) at the air vent, power based at least in part on the rate of airflow through the air vent. In one aspect, the power generation manager 215 may generate the power at one or more sensors located at or near the air vent (e.g., temperature sensor, occupancy sensor, motion sensor, humidity sensor, light condition sensor, etc.).

In some examples, the power generation manager 215 may include a power generator within one or more sensor units 110 located at/near the air vent in the centralized heating and cooling system. Additionally or alternatively, the power generation manager 215 coupled with the one or more sensor units 110 may monitor airflow through the air vent over a period of time. Additionally or alternatively, the power generation manager 215 may detect when there is enough airflow to generate power (i.e., a threshold rate of airflow). In some examples, upon detecting that the rate of airflow through the air vent satisfies a predefined threshold (i.e., the threshold rate of airflow), the power generation manager 215 coupled with the one or more sensor units 110 may begin generating power using the airflow through the air vent. In some examples, the power generation manager 215 may receive instructions to start generating power, from the control panel 135. In some examples, the air vent may be a smart air vent (i.e., air vent with capabilities of a smart home). In some examples, the air vent may be a vent associated with an HVAC system.

In some cases, the power generation manager 215 may store the generated power in the sensor unit located at or near the air vent (e.g., smart vent). For example, the power generation manager 215 may store the generated power in one or more rechargeable batteries associated with the sensor unit 110 located at or near the air vent. In some examples, the rechargeable batteries may be located within the sensor units 110. Additionally or alternatively, the rechargeable batteries may be coupled with the sensor units 110. Additionally or alternatively, the power generation manager 215 may provide the stored power to one or more motors associated with the sensor (e.g., sensor unit 110) at the air vent. In some examples, the power generation manager 215 may utilize the stored power to perform communication between the sensor (e.g., a sensor unit 110) at the air vent and a control panel (e.g., control panel 135) of the home automation system, wherein the control panel is located at a location different from a location of the sensor. In some examples, the stored power may be utilized to perform communications between a first sensor unit 110 located at or near the air vent (e.g., smart vent in a centralized heating and cooling system) and a second sensor unit 110 located at a location different from the first sensor.

In some examples, the stored power (e.g., power stored in rechargeable batteries within the sensor unit 110) may be used to power the motors associated with the sensor. In some examples, the stored power may also be used provide power to other parts of the sensor. Additionally or alternatively, the power generation manager 215 may provide instructions to share the stored power, to at least one sensor unit 110 located within a threshold distance from the air vent. For example, two or more sensor units 110 may be coupled to share the stored power. In such circumstances, at least one sensor unit 110 may be able to use stored power from another sensor unit 110 (e.g., sensor unit located at or near the air vent). For example, at night time, the light condition detection sensor may detect that it is dark outside and may go into a conservation level. Another sensor (e.g., a motion sensor) may still be active at that time, and may use the stored power from the light condition detection sensor. In some examples, the sensors may be configured to share their stored power, if their stored power levels satisfies a threshold. For example, if the light condition detection sensor determines that the stored power level satisfies a threshold and if it determines that the motion sensor is within a threshold distance, then the light condition detection sensor may share it's stored power with the motion sensor.

In one example, power generation manager 215 in communication with the sensor units 110 and the control panel 135 may monitor a level associated with the power stored in the sensor. For example, the power generation manager 215 may monitor whether the stored power level is sufficient to provide power to the motor. In some examples, the power generation manager 215 may monitor whether the stored power level is sufficient to perform communications between at least one sensor unit 110 located at or near the air vent in a centralized heating and cooling system (e.g., HVAC system) and a control panel of the home automation system. In some examples, the power generation manager 215 may monitor whether the stored power level is sufficient to perform communications between at least one sensor unit 110 located at or near the air vent and another sensor unit 110 located within a threshold distance from the air vent.

In some examples, the power generation manager 215 coupled with at least one sensor unit 110 may determine whether the level associated with the power satisfies a predetermined threshold. For example, the power generation manager 215 may determine whether the stored power level is sufficient to provide power to the sensor units 110 for a threshold amount of time, if no new power is generated. In some examples, in response to the level not satisfying the predetermined threshold, the power generation manager 215 may adjust an opening angle of one or more air vents in the centralized heating & cooling system to increase the rate of airflow through the one or more air vents. For example, the power generation manager 215 may determine that the level of power stored at one or more sensor units 110 is below a predefined threshold level of power, and the power generation manager 215 may increase an opening angle of the one or more air vents to increase the rate of airflow through the one or more air vents.

Additionally or alternatively, upon determining that the stored power level does not satisfy the predetermined threshold, the power generation manager 215 may adjust at least one of a fan of the centralized heating & cooling system and a thermostat level associated with the home automation system to increase the rate of airflow through one or more air vents in the centralized heating & cooling system. In some cases, the power generation manager 215 may be coupled to a thermostat of the home and automation system. In some examples, the power generation manager 215 may receive instructions from control panel 135 to adjust the thermostat level. In some cases, the power generation manager 215 may monitor temperature inside a home. In some examples, the power generation manager 215 may determine that the stored power level is insufficient to provide power to the sensor units 110 for a threshold amount of time, if no new power is generated. Upon determining that the power level is insufficient, the power generation manager 215 may adjust the thermostat level to increase the rate of air flow through the air vent in the centralized heating and cooling system.

In some examples, the power generation manager 215 coupled with at least one sensor unit 110 may determine whether a home is occupied. In some examples, the power generation manager 215 may use a plurality of occupancy sensors to determine occupancy of a home. A non-exhaustive list of occupancy sensor types may include microphones, motion detectors, video cameras, mobile devices, location devices, infrared devices, temperature devices, touch input devices, other types of devices, or combinations thereof. Upon determining that the home is unoccupied, the power generation manager 215 may adjust one or more sensor units 110 at the air vent to a conservation level in response to determining that the home has no occupancy. In some examples, the power generation manager 215 may adjust at least one sensor unit located within a threshold distance from the air vent. For example, the power generation manager 215 may adjust lighting, thermostat parameters, and/or security parameters in the home. In some examples, the conservation level may cause a thermostat to lower its value to conserve energy while the home is unoccupied. For example, the power generation manager 215 may adjust at least one sensor unit 110 to a conservation level to conserve the power stored in the at least one sensor unit 110. Upon determining that the home is unoccupied, the power generation manager 215 may continue to monitor the home for occupancy.

In some examples, the power generation manager 215 coupled with at least one sensor unit 110 may generate a schedule reflecting occupancy of the home. In some examples, the power generation manager 215 may generate the schedule based on a number of observation periods. In some examples, the schedule is not generated until a trial period is completed when the power generation manager 215 has sufficient data points to predict the schedule reflecting occupancy of the home. In some examples, the trial period is a week, two weeks, a month, multiple months, other time periods, or combinations thereof. In some examples, the power generation manager 215 analyze occupancy pattern of a home for a threshold period of time prior to generating the schedule. In some cases, the power generation manager 215 may continue to analyze occupancy patterns of the home after the schedule reflecting occupancy is generated. The power generation manager 215 coupled to one or more sensor units 110 may modify the schedule to reflect additional data analyzed after generation of the schedule. For example, the power generation manager 215 may determine that the occupants of a home leave around 7:30 a.m. in the morning. However, after the generation of the initial schedule, the occupants may begin leaving around 7:45 a.m. In such circumstances, the power generation manager 215 may cause the schedule to change based on the changes to the occupants' schedule.

Additionally or alternatively, the power generation manager 215 may adjust one or more sensors at the air vent to a conservation level based at least in part on the schedule. Upon determining that the home is unoccupied, the power generation manager 215 may adjust at least one sensor unit located within a threshold distance from the air vent. For example, the power generation manager 215 may adjust lighting, thermostat parameters, and/or security parameters in the home.

The transmitter component 220 may transmit the one or more signals received from other components of the apparatus 205. The transmitter component 220 may transmit information collected by sensors such as rate of airflow, stored energy, occupancy associated with a property, and the like. In some examples, the transmitter component 220 may be collocated with the receiver component 210 in a transceiver module.

Figure 3:
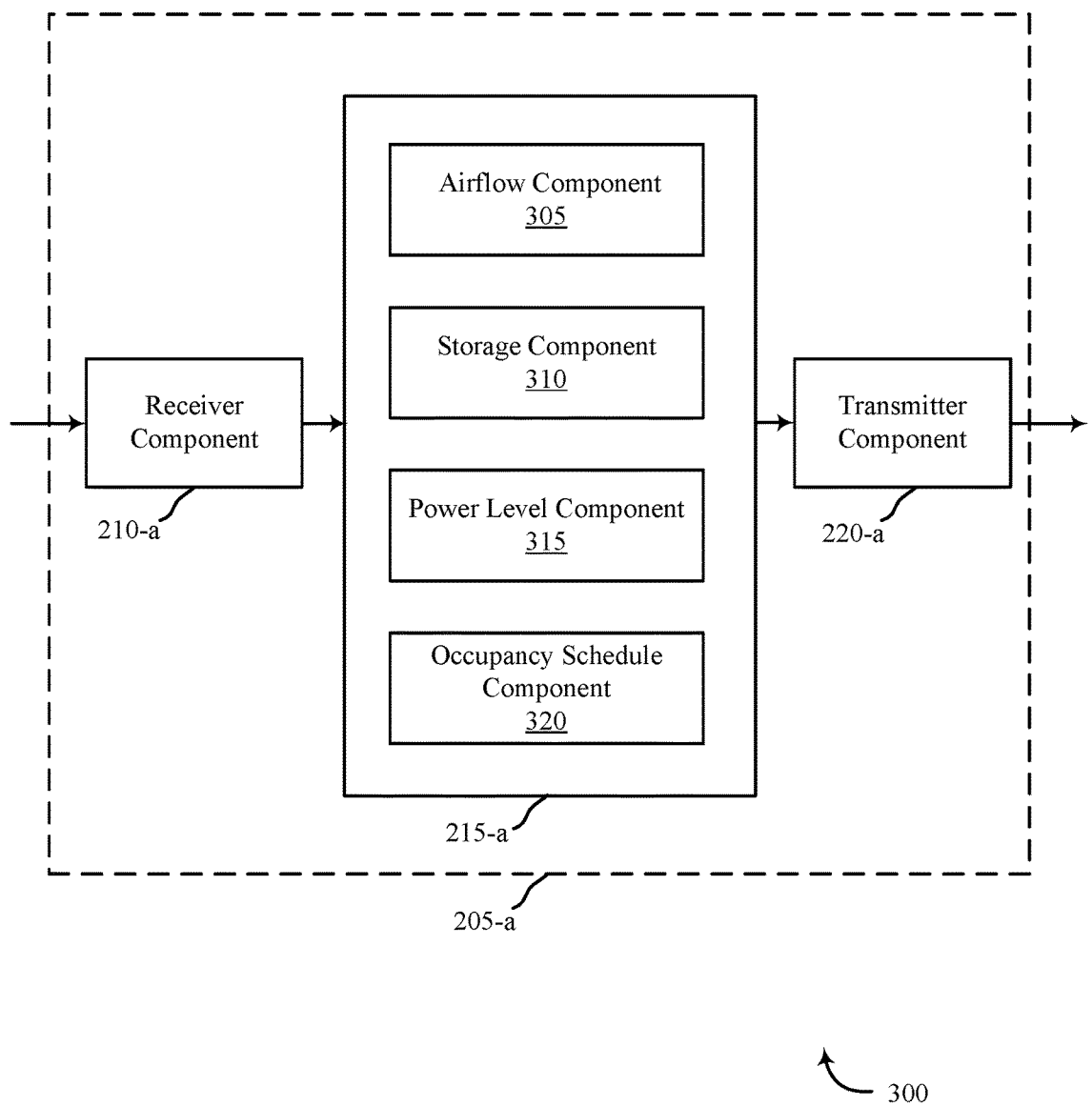
FIG. 3 shows a block diagram relating to an example security and automation system, in accordance with one or more aspects of the present disclosure.

FIG. 3 shows a block diagram 300 relating to an example a security and automation system, in accordance with one or more aspects of the present disclosure. The apparatus 205-*a* may be an example of one or more aspects of a control panel 135 described with reference to FIG. 1. The apparatus 205-*a* may include a receiver component 210-*a*, a power generation manager 215-*a*, and/or a transmitter component 220-*a*. The apparatus 205-*a* may also be or include a processor. In some aspects, apparatus 205-*a* may be an example of one or more aspects of apparatus 205 described with reference to FIG. 2. Each of these components or modules may be in communication with each other—directly and/or indirectly. In some embodiments, apparatus 205 may be integrated with at least one sensor unit 110. In one embodiment, where apparatus 205-*a* is a control panel, apparatus 205-*a* may be a control panel in the form of an interactive home automation system display. In some embodiments, apparatus 205-*a* may be a local computing device 120 such as a personal computer or portable electronic device (e.g., smart phone, smart watch, tablet computer). In some embodiments, apparatus 205 may be coupled to at least one sensor unit 110.

In one embodiment, where apparatus 205-*a* is a control panel, apparatus 205-*a* may be a control panel in the form of an interactive home automation system display. In one embodiment, apparatus 205-*a* may be a smart vent associated with a home automation system. In one embodiment, apparatus 205-*a* may be a smart air vent in a centralized heating and cooling system (e.g., HVAC system) associated with a home automation system. In some embodiments, apparatus 205-*a* may be coupled to at least one sensor unit 110. In one embodiment, apparatus 205-*a* may be a smart vent coupled with at least one sensor unit 110.

In some examples, the power generation manager 215-*a*, may include airflow component 305, storage component 310, power level component 315, and/or occupancy schedule component 320. In some aspects, the power generation manager 215-*a* may be an examples of one or more aspects of power generation manager 215 described with reference to FIG. 2. The components of the apparatus 205-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented—in whole or in part—with instructions embodied in memory formatted to be executed by one or more general and/or application-specific processors.

The receiver component 210-a may receive information such as packets, user data, and/or control information associated with various information channels (e.g., control channels, data channels, etc.). In some examples, the receiver component 210-a may be configured to receive instructions at the apparatus 205-a. In one aspect, the receiver component 210-a may be configured to receive instruction from local computing device 120 and/or remote computing device 140. In some examples, the received instruction may be in the form of a verbal command and/or a tactile input. In further examples, the receiver component 210-a may receive airflow information, stored power information, user identification information and/or occupancy information from the sensor units 110, local computing device 120, remote computing device 140, and/or server 155. In some examples, information (e.g., airflow information, stored power information, user identification information, occupancy information) may be passed on to the power generation manager 215-a, and to other components of the apparatus 205-a. In some aspects, the receiver component 210-a may be an example of one or more aspects of the receiver component 210-a described with reference to FIG. 2.

In some examples, the airflow component 305 may be in communication with the sensor units 110. The airflow component 305 may monitor a rate of airflow through an air vent in a centralized heating and cooling system. In some examples, the airflow component 305 may be a part of a home automation system. For example, in conjunction with at least one sensor unit 110, the airflow component 305 may monitor a rate of flow of air through a smart air vent (e.g., airflow through a vent of an HVAC system). In some examples, the at least one sensor unit 110 may include at least one of a motion sensor, a camera sensor, a shock sensor, a proximity sensor, an appliance sensor, a temperature sensor, a humidity sensor, a light beam sensor, a smoke sensor, a glass break sensor, and a carbon monoxide sensor. The airflow component 305 may generate at a sensor (e.g., sensor unit 110) at the air vent, power based at least in part on the rate of airflow through the air vent. In one aspect, the airflow component 305 may generate the power at one or more sensors located at or near the air vent (e.g., temperature sensor, occupancy sensor, motion sensor, humidity sensor, light condition sensor, etc.).

In some examples, the airflow component 305 may include a power generator within one or more sensor units 110 located at/near the air vent in the centralized heating and cooling system. Additionally or alternatively, the airflow component 305 coupled with the one or more sensor units 110 may monitor airflow through the air vent over a period of time. Additionally or alternatively, the airflow component 305 may detect when there is enough airflow to generate power (i.e., a threshold rate of airflow). In some examples, upon detecting that the rate of airflow through the air vent satisfies a predefined threshold (i.e., the threshold rate of airflow), the airflow component 305 coupled with the one or more sensor units 110 may begin generating power using the airflow through the air vent. In some examples, the airflow component 305 may receive instructions to start generating power, from the control panel 135. In some examples, the air vent may be a smart air vent (i.e., air vent with capabilities of a smart home). In some examples, the air vent may be a vent associated with an HVAC system.

In some cases, the storage component 310 may store the generated power in the sensor unit located at or near the air vent (e.g., smart vent). For example, the storage component 310 may store the generated power in one or more rechargeable batteries associated with the sensor unit 110 located at or near the air vent. In some examples, the rechargeable batteries may be located within the sensor units 110. Additionally or alternatively, the rechargeable batteries may be coupled with the sensor units 110. Additionally or alternatively, the storage component 310 may provide the stored power to one or more motors associated with the sensor (e.g., sensor unit 110) at the air vent. In some examples, the storage component 310 may utilize the stored power to perform communications between the sensor (e.g., a sensor unit 110) located at the air vent and a control panel (e.g., control panel 135) of the home automation system, wherein the control panel is located at a location different from a location of the sensor. In some examples, the stored power may be utilized to perform communications between a first sensor unit 110 located at or near the air vent (e.g., smart vent in a centralized heating and cooling system) and a second sensor unit 110 located at a location different from the first sensor.

In some examples, the stored power (e.g., power stored in rechargeable batteries within the sensor unit 110) may be used to power the motors associated with the sensor. In some examples, the stored power may also be used provide power to other parts of the sensor. Additionally or alternatively, the storage component 310 may provide instructions to share power, to at least one sensor unit 110 located within a threshold distance from the air vent. For example, two or more sensor units 110 may be coupled to share the stored power. In such circumstances, at least one sensor unit 110 may be able to use stored power from another sensor unit 110 (e.g., sensor unit located at or near the air vent). For example, at night time, the light condition detection sensor may detect that it is dark outside and may go into a conservation level. Another sensor (e.g., a motion sensor) may still be active at that time, and may use the stored power from the light condition detection sensor. In some examples, the sensors may be configured to share their stored power, if their stored power levels satisfies a threshold.

In some examples, the power level component 315 in communication with the sensor units 110 and the control panel 135 may monitor a level associated with the power stored in the sensor. For example, the power level component 315 may monitor whether the stored power level is sufficient to provide power to the motor. In some examples, the power level component 315 may monitor whether the stored power level is sufficient to perform communications between at least one sensor unit 110 located at or near the air vent in a centralized heating and cooling system (e.g., HVAC system) and a control panel 135 of the home automation system. In some examples, the power level component 315 may monitor whether the stored power level is sufficient to perform communications between at least one sensor unit 110 located at or near the air vent and another sensor unit 110 located within a threshold distance from the air vent.

In some examples, the power level component 315 coupled with at least one sensor unit 110 may determine whether the level associated with the power satisfies a predetermined threshold. For example, the power level component 315 may determine whether the stored power level is sufficient to provide power to the sensor units 110 for a threshold amount of time, if no power is generated for a threshold period of time in future.

In some examples, the occupancy schedule component 320 coupled with at least one sensor unit 110 may generate a schedule reflecting occupancy of the home. In some examples, the occupancy schedule component 320 may use a plurality of occupancy sensors to determine occupancy of a home. A non-exhaustive list of occupancy sensor types may include microphones, motion detectors, video cameras, mobile devices, location devices, infrared devices, temperature devices, touch input devices, other types of devices, or combinations thereof. In some examples, the occupancy schedule component 320 may generate the schedule based on a number of observation periods. In some examples, the schedule is not generated until a trial period is completed until the occupancy schedule component 320 has sufficient data points to predict the schedule reflecting occupancy of the home. In some examples, the trial period is a week, two weeks, a month, multiple months, other time periods, or combinations thereof. In some examples, the occupancy schedule component 320 may analyze occupancy pattern of a home for a threshold period of time prior to generating the schedule. In some cases, the occupancy schedule component 320 may continue to analyze occupancy patterns of the home after the schedule reflecting occupancy is generated. In some examples, the occupancy schedule component 320 coupled to one or more sensor units 110 may modify the schedule to reflect additional data analyzed after generation of the schedule. For example, occupancy schedule component 320 may determine that the occupants of a home leave around 7:30 a.m. in the morning. However, after the generation of the initial schedule, the occupants may begin leaving around 7:45 a.m. In such circumstances, occupancy schedule component 320 may cause the schedule to change based on the changes to the occupants' schedule.

Additionally or alternatively, the occupancy schedule component 320 may adjust one or more sensors at the air vent to a conservation level based at least in part on the schedule. Upon determining that the home is unoccupied, the occupancy schedule component 320 may adjust at least one sensor unit located within a threshold distance from the air vent. For example, the occupancy schedule component 320 may adjust lighting, thermostat parameters, and/or security parameters in the home.

The transmitter component 220-a may transmit the one or more signals received from other components of the apparatus 205-a. The transmitter component 220-a may transmit information collected by sensors such as rate of airflow, stored energy, occupancy associated with a property, and the like. In some examples, the transmitter component 220-a may be collocated with the receiver component 210-a in a transceiver module. In some aspects, transmitter component 220-a may be an example of one or more aspects of transmitter component 220 with reference to FIG. 2.

Figure 4:
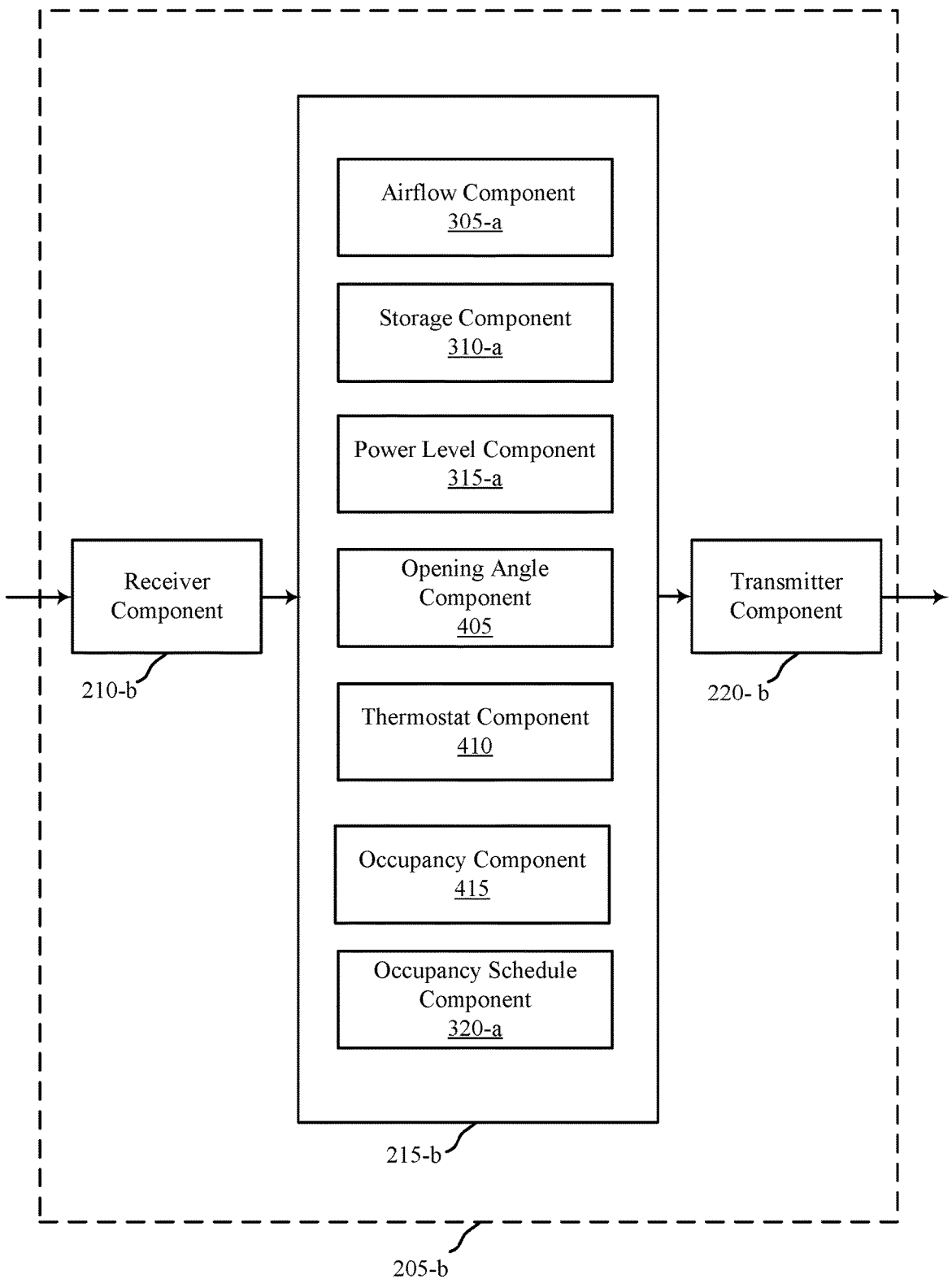
FIG. 4 shows a block diagram relating to an example security and automation system, in accordance with one or more aspects of the present disclosure.

FIG. 4 shows a block diagram 400 relating to an example a security and automation system, in accordance with one or more aspects of the present disclosure. The apparatus 205-b may be an example of one or more aspects of a control panel 135 described with reference to FIG. 1. The apparatus 205-b may include a receiver component 210-b, a power generation manager 215-b, and/or a transmitter component 220-b. The apparatus 205-b may be or include a processor. In some aspects, apparatus 205-b may be an example of one or more aspects of apparatus 205 or 205-a described with reference to FIGS. 2 and 3. Each of these components or modules may be in communication with each other—directly and/or indirectly. In one embodiment, where apparatus 205-a is a control panel, apparatus 205-a may be a control panel in the form of an interactive home automation system display. In one embodiment, apparatus 205-a may be a smart vent associated with a home automation system. In one embodiment, apparatus 205-a may be a smart air vent in a centralized heating and cooling system (e.g., HVAC system) associated with a home automation system. In some embodiments, apparatus 205-a may be coupled to at least one sensor unit 110. In one embodiment, apparatus 205-a may be a smart vent coupled with at least one sensor unit 110. In some embodiments, apparatus 205-b may be a local computing device 120 such as a personal computer or portable electronic device (e.g., smart phone, smart watch, tablet computer). In some embodiments, apparatus 205-b may be coupled to at least one sensor unit 110.

In some examples, the power generation manager 215-b, may include airflow component 305-a, storage component 310-a, power level component 315-a, opening angle component 405, thermostat component 410, occupancy component 415, and/or occupancy schedule component 320-a. In some aspects, the power generation manager 215-b may be an example of one or more aspects of power generation manager 215 and 215-a described with reference to FIGS. 2 and 3. The components of the apparatus 205-b may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented—in whole or in part—with instructions embodied in memory formatted to be executed by one or more general and/or application-specific processors.

The receiver component 210-b may receive information such as packets, user data, and/or control information associated with various information channels (e.g., control channels, data channels, etc.). In some examples, the receiver component 210-b may be configured to receive instructions at the apparatus 205-b. In one aspect, the receiver component 210-b may be configured to receive instruction from local computing device 120 and/or remote computing device 140. In some examples, the received instruction may be in the form of a verbal command and/or a tactile input. In further examples, the receiver component 210-b may receive airflow information, stored power information, user identification information and/or occupancy information from the sensor units 110, local computing device 120, remote computing device 140, and/or server 155. In some examples, information (e.g., airflow information, stored power information, user identification information, occupancy information) may be passed on to the power generation manager 215-b, and to other components of the apparatus 205-b. In some aspects, the receiver component 210-b may be an example of one or more aspects of the receiver component 210 or 210-a described with reference to FIGS. 2 and 3.

In some examples, the airflow component 305-a may be in communication with the sensor units 110. In some examples, the airflow component 305-a may monitor a rate of airflow through an air vent in a centralized heating and cooling system. In some examples, the airflow component 305-a may be a part of a home automation system. For example, in conjunction with at least one sensor unit 110, the airflow component 305-a may monitor a rate of flow of air through a smart air vent (e.g., airflow through a vent of an HVAC system). In some examples, the at least one sensor unit 110 may include at least one of a motion sensor, a camera sensor, a shock sensor, a proximity sensor, an appliance sensor, a temperature sensor, a humidity sensor, a light beam sensor, a smoke sensor, a glass break sensor, and a carbon monoxide sensor. In some examples, the airflow component 305-a may generate at a sensor (e.g., sensor unit 110) at the air vent, power based at least in part on the rate of airflow through the air vent. In one aspect, the airflow component 305-a may generate the power at one or more sensors located at or near the air vent (e.g., temperature sensor, occupancy sensor, motion sensor, humidity sensor, light condition sensor, etc.).

In some examples, the airflow component 305-a may include a power generator within one or more sensor units 110 located at/near the air vent in the centralized heating and cooling system. Additionally or alternatively, the airflow component 305-a coupled with the one or more sensor units 110 may monitor airflow through the air vent over a period of time. Additionally or alternatively, the airflow component 305-a may detect when there is enough airflow to generate power (i.e., a threshold rate of airflow). In some examples, upon detecting that the rate of airflow through the air vent satisfies a predefined threshold (i.e., the threshold rate of airflow), the airflow component 305-a coupled with the one or more sensor units 110 may begin generating power using the airflow through the air vent.

In some cases, the storage component 310-a may store the generated power in the sensor unit located at or near the air vent (e.g., smart vent). For example, the storage component 310-a may store the generated power in one or more rechargeable batteries associated with the sensor unit 110 located at or near the air vent. In some examples, the rechargeable batteries may be located within the sensor units 110. Additionally or alternatively, the rechargeable batteries may be coupled with the sensor units 110. Additionally or alternatively, the storage component 310-a may provide the stored power to one or more motors associated with the sensor (e.g., sensor unit 110) at the air vent. In some examples, the storage component 310-a may utilize the stored power to perform communications between the sensor (e.g., a sensor unit 110) located at the air vent and a control panel (e.g., control panel 135) of the home automation system, wherein the control panel is located at a location different from a location of the sensor. In some examples, the stored power may be utilized to perform communications between a first sensor unit 110 located at or near the air vent (e.g., smart vent in a centralized heating and cooling system) and a second sensor unit 110 located at a location different from the first sensor.

In some examples, the storage component 310-a may provide instructions to share power, to at least one sensor unit 110 located within a threshold distance from the air vent. For example, two or more sensor units 110 may be coupled to share the stored power. In such examples, at least one sensor unit 110 may be able to use stored power from another sensor unit 110 (e.g., sensor unit located at or near the air vent). For example, at night time, the light condition detection sensor may detect that it is dark outside and may go into a conservation level. Another sensor (e.g., a motion sensor) may still be active at that time, and may use the stored power from the light condition detection sensor. In some examples, the sensors may be configured to share their stored power, if their stored power levels satisfies a threshold.

In some examples, the power level component 315-a in communication with the sensor units 110 and the control panel 135 may monitor a level associated with the power stored in the sensor. For example, the power level component 315-a may monitor whether the stored power level is sufficient to provide power to the motor. In some examples, the power level component 315-a may monitor whether the stored power level is sufficient to perform communications between at least one sensor unit 110 located at or near the air vent in a centralized heating and cooling system (e.g., HVAC system) and a control panel 135 of the home automation system. In some examples, the power level component 315-a may monitor whether the stored power level is sufficient to perform communications between at least one sensor unit 110 located at or near the air vent and another sensor unit 110 located within a threshold distance from the air vent.

In some examples, the power level component 315-a coupled with at least one sensor unit 110 may determine whether the level associated with the power satisfies a predetermined threshold. For example, the power level component 315-a may determine whether the stored power level is sufficient to provide power to the sensor units 110 for a threshold amount of time, if no power is generated for a threshold period of time in future.

In some examples, in response to the level not satisfying the predetermined threshold, the power level component 315-a may indicate that level does not satisfy the threshold, to the opening angle component 405 and the thermostat component 410. In some examples, in response to the level not satisfying the predetermined threshold, the opening angle component 405 may adjust an opening angle of one or more air vents in the centralized heating & cooling system to increase the rate of airflow through the one or more air vents. For example, the opening angle component 405 may receive an indication from the power level component 315-a, the indication describing that the level of power stored at one or more sensor units 110 is below a predefined threshold level of power. Upon receiving the indication, in some examples, the opening angle component 405 may increase an opening angle of the one or more air vents to increase the rate of airflow through the one or more air vents.

Additionally or alternatively, upon determining that the stored power level does not satisfy the predetermined threshold, the thermostat component 410 may adjust at least one of a fan of the centralized heating & cooling system and a thermostat level associated with the home automation system to increase the rate of airflow through one or more air vents in the centralized heating & cooling system. In some cases, the thermostat component 410 may be coupled to a thermostat of the home and automation system. In some examples, the thermostat component 410 may receive instructions from control panel 135 to adjust the thermostat level. In some cases, the thermostat component 410 may monitor temperature inside a home. In some examples, the thermostat component 410 may receive an indication that the stored power level in one or more sensor units 110 is insufficient to provide power to the sensor units 110 for a threshold amount of time, if no new power is generated. Upon receiving the indication that the power level is insufficient, the thermostat component 410 may adjust the thermostat level to increase the rate of air flow through the air vent in the centralized heating and cooling system.

In some examples, the occupancy component 415 coupled with at least one sensor unit 110 may determine whether a home is occupied. In some examples, the occupancy component 415 may use a plurality of occupancy sensors to determine occupancy of a home. A non-exhaustive list of occupancy sensor types may include microphones, motion detectors, video cameras, mobile devices, location devices, infrared devices, temperature devices, touch input devices, other types of devices, or combinations thereof. Upon determining that the home is unoccupied, the occupancy component 415 may adjust one or more sensor units 110 at the air vent to a conservation level in response to determining that the home has no occupancy. In some examples, the occupancy component 415 may adjust at least one sensor unit located within a threshold distance from the air vent. For example, the occupancy component 415 may adjust lighting, thermostat parameters, and/or security parameters in the home. In some examples, the conservation level may cause a thermostat to lower its value to conserve energy while the home is unoccupied. For example, the occupancy component 415 may adjust at least one sensor unit 110 to a conservation level to conserve the power stored in the at least one sensor unit 110. Upon determining that the home is unoccupied, the occupancy component 415 may continue to monitor the home for occupancy.

In some examples, the occupancy schedule component 320-*a* coupled with at least one sensor unit 110 may generate a schedule reflecting occupancy of the home. In some examples, the occupancy schedule component 320-*a* may use a plurality of occupancy sensors to determine occupancy of a home. A non-exhaustive list of occupancy sensor types may include microphones, motion detectors, video cameras, mobile devices, location devices, infrared devices, temperature devices, touch input devices, other types of devices, or combinations thereof. In some examples, the occupancy schedule component 320-*a* may generate the schedule based on a number of observation periods. In some examples, the schedule is not generated until a trial period is completed until the occupancy schedule component 320-*a* has sufficient data points to predict the schedule reflecting occupancy of the home. In some examples, the trial period is a week, two weeks, a month, multiple months, other time periods, or combinations thereof. In some examples, the occupancy schedule component 320-*a* may analyze occupancy pattern of a home for a threshold period of time prior to generating the schedule. In some cases, the occupancy schedule component 320-*a* may continue to analyze occupancy patterns of the home after the schedule reflecting occupancy is generated. In some examples, the occupancy schedule component 320-*a* coupled to one or more sensor units 110 may modify the schedule to reflect additional data analyzed after generation of the schedule. For example, occupancy schedule component 320-*a* may determine that the occupants of a home leave around 7:30 a.m. in the morning. However, after the generation of the initial schedule, the occupants may begin leaving around 7:45 a.m. In such circumstances, occupancy schedule component 320-*a* may cause the schedule to change based on the changes to the occupants' schedule.

Additionally or alternatively, the occupancy schedule component 320-*a* may adjust one or more sensors at the air vent to a conservation level based at least in part on the schedule. Upon determining that the home is unoccupied, the occupancy schedule component 320-*a* may adjust at least one sensor unit located within a threshold distance from the air vent. For example, the occupancy schedule component 320-*a* may adjust lighting, thermostat parameters, and/or security parameters in the home.

The transmitter component 220-*b* may transmit the one or more signals received from other components of the apparatus 205-*b*. The transmitter component 220-*b* may transmit information collected by sensors such as rate of airflow, stored energy, occupancy associated with a property, and the like. In some examples, the transmitter component 220-*b* may be collocated with the receiver component 210-*b* in a transceiver module. In some aspects, transmitter component 220-*b* may be an example of one or more aspects of transmitter component 220 or 220-*a* with reference to FIGS. 2 and 3.

Figure 5:
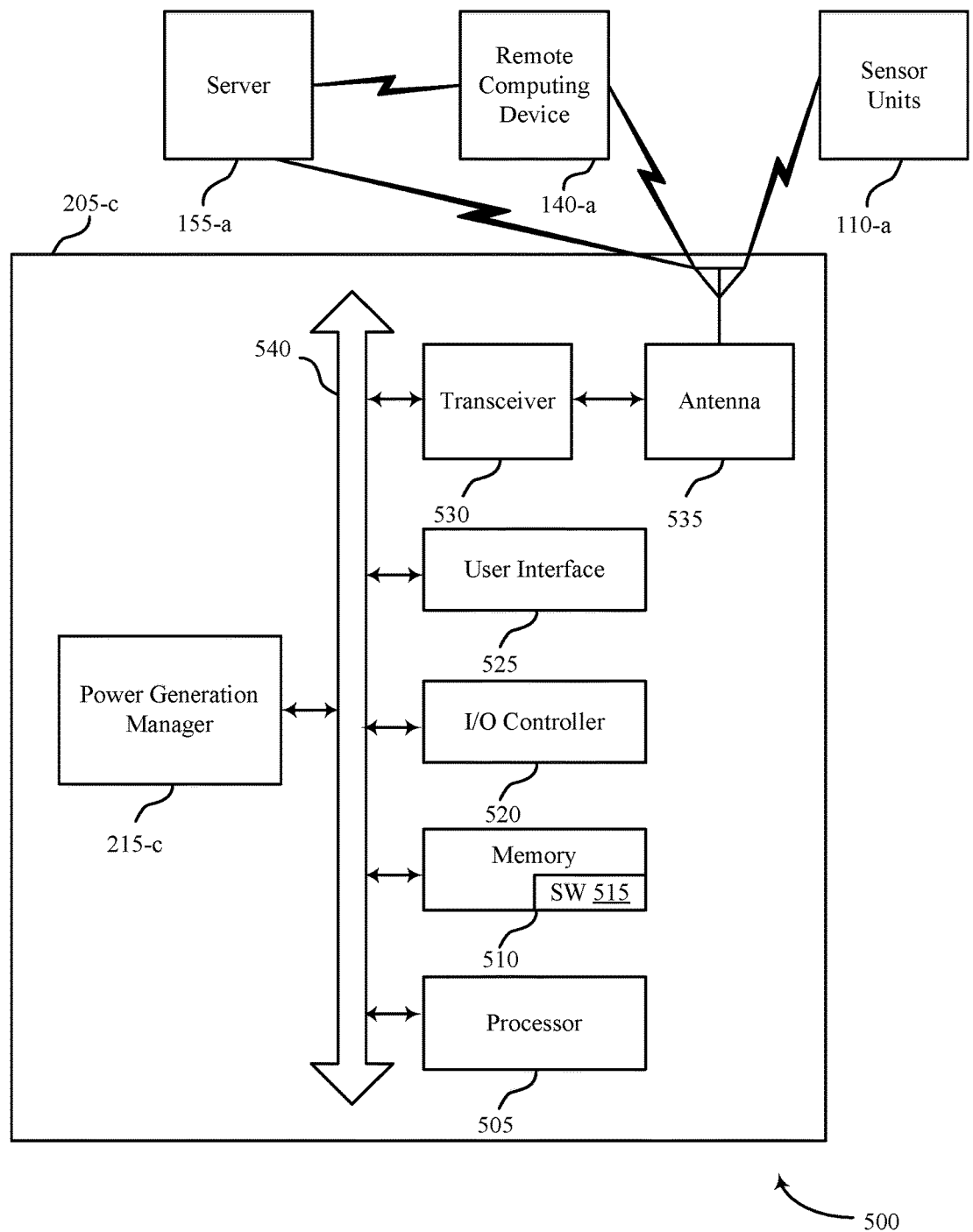
FIG. 5 shows a block diagram of an apparatus relating to an example security and automation system, in accordance with one or more aspects of the present disclosure.

FIG. 5 shows a block diagram 500 of an apparatus 205-*c* relating to a security and automation system, in accordance with one or more aspects of the present disclosure. Apparatus 205-*c* may be an example of the control panel 135, local computing device 120, and/or the sensor units 110 of FIG. 1. In some examples, apparatus 205-*c* may also be an example of one or more aspects of apparatus 205, 205-*a*, and/or 205-*b* with reference to FIGS. 2-4.

Apparatus 205-*c* may include a power generation manager 215-*c*, which may be an example of the power generation manager 215-*a* and/or 215-*b* described with reference to FIGS. 2 and 3. The power generation manager 215-*c* may provide techniques for reducing generating power utilizing HVAC ventilation air flow, as described above with reference to FIGS. 1-4.

Apparatus 205-*c* may also include components for bi-directional data communications including components for transmitting communications and components for receiving communications. For example, apparatus 205-*c* may communicate bi-directionally with remote computing device 140-*a*, server 155-*a*, or sensor units 110-*a*. This bi-directional communication may be direct (e.g., apparatus 205-*c* communicating directly with sensor units 110-*a* or remote computing device 140-*a*) or indirect (e.g., apparatus 205-*b* communicating with remote computing device 140-*a* via server 155-*a*). Server 155-*a*, remote computing device 140-*a*, and sensor units 110-*a* may be examples of server 155, remote computing device 140, and sensor units 110 as shown with respect to FIG. 1.

Apparatus 205-*c* may also include a processor 505, and memory 510 (including software (SW) 515), an input/output (I/O) controller 520, a user interface 525, a transceiver 530, and one or more antennas 535, each of which may communicate—directly or indirectly—with one another (e.g., via one or more buses 540). The transceiver 530 may communicate bi-directionally—via the one or more antennas 535, wired links, and/or wireless links—with one or more networks or remote devices as described above. For example, the transceiver 530 may communicate bi-directionally with one or more of server 155-*a* or sensor unit 110-*a*. The transceiver 530 may include a modem to modulate the packets and provide the modulated packets to the one or more antennas 535 for transmission, and to demodulate packets received from the one or more antennas 535. While an apparatus 205-*c* may include a single antenna 535, the apparatus may also have multiple antennas 535 capable of concurrently transmitting or receiving multiple wired and/or wireless transmissions. In some embodiments, one element of apparatus 205-*c* (e.g., one or more antennas 535, transceiver 530, etc.) may provide a direct connection to a server 155-*a* via a direct network link to the Internet via a POP (point of presence). In some embodiments, one element of apparatus 205-*c* (e.g., one or more antennas 535, transceiver 530, etc.) may provide a connection using wireless techniques, including digital cellular telephone connection, Cellular Digital Packet Data (CDPD) connection, digital satellite data connection, and/or another connection.

The signals associated with apparatus 205-c, server 155-a, remote computing device 140-a, and/or sensor unit 110-a may include wireless communication signals such as radio frequency, electromagnetics, LAN, WAN, virtual private network (VPN), wireless network (using 802.11, for example), 345 MHz, Z Wave, cellular network (using 3G and/or LTE, for example), and/or other signals. The one or more antennas 535 and/or transceiver 530 may include or be related to, but are not limited to, wireless wide area network (WWAN) (GSM, CDMA, and WCDMA), WLAN (including Bluetooth and Wi-Fi), WMAN (WiMAX), antennas for mobile communications, antennas for Wireless Personal Area Network (WPAN) applications (including radio-frequency identification (RFID) and ultra-wideband (UWB)). In some embodiments, each antenna 535 may receive signals or information specific and/or exclusive to itself. In other embodiments each antenna 535 may receive signals or information neither specific nor exclusive to itself.

In some embodiments, the user interface 525 may include an audio device, such as an external speaker system, a visual device such as a camera or video camera, an external display device such as a display screen, and/or an input device (e.g., remote control device interfaced with the user interface 525 directly and/or through I/O controller 520). In some examples, one or more buses 540 may allow data communication between one or more elements of apparatus 205-c (e.g., processor 505, memory 510, I/O controller 520, user interface 525, etc.).

The memory 510 may include RAM, ROM, flash RAM, and/or other types. The memory 510 may store computer-readable, computer-executable software/firmware code 515 including instructions that, when executed, cause the processor 505 to perform various functions described in this disclosure (e.g., analyzing the authentication credentials, transmitting a message to a remote device, etc.). Alternatively, the computer-executable software/firmware code 515 may not be directly executable by the processor 505 but may cause a computer (e.g., when compiled and executed) to perform functions described herein.

In some embodiments the processor 505 may include, among other things, an intelligent hardware device (e.g., a central processing unit (CPU), a microcontroller, and/or an ASIC, etc.). The memory 510 may contain, among other things, the Basic Input-Output system (BIOS) which may control basic hardware and/or software operation such as the interaction with peripheral components or devices. For example, the power generation manager 215-c may be stored within the memory 510. Applications resident with apparatus 205-c are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver 530, one or more antennas 535, etc.).

Many other devices and/or subsystems may be connected to, or may be included as, one or more elements of apparatus 205-c (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and is not discussed in detail in this disclosure. Code to implement the present disclosure may be stored in a non-transitory computer-readable medium such as one or more of memory 510 or other memory. The operating system provided on I/O controller 520 may be iOS®, ANDROID®, MS-DOS®, MS-WINDOWS®, OS/2®, UNIX®, LINUX®, or another known operating system.

The components of the apparatus 205-c may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented—in whole or in part—with instructions embodied in memory formatted to be executed by one or more general and/or application-specific processors.

Figure 6:
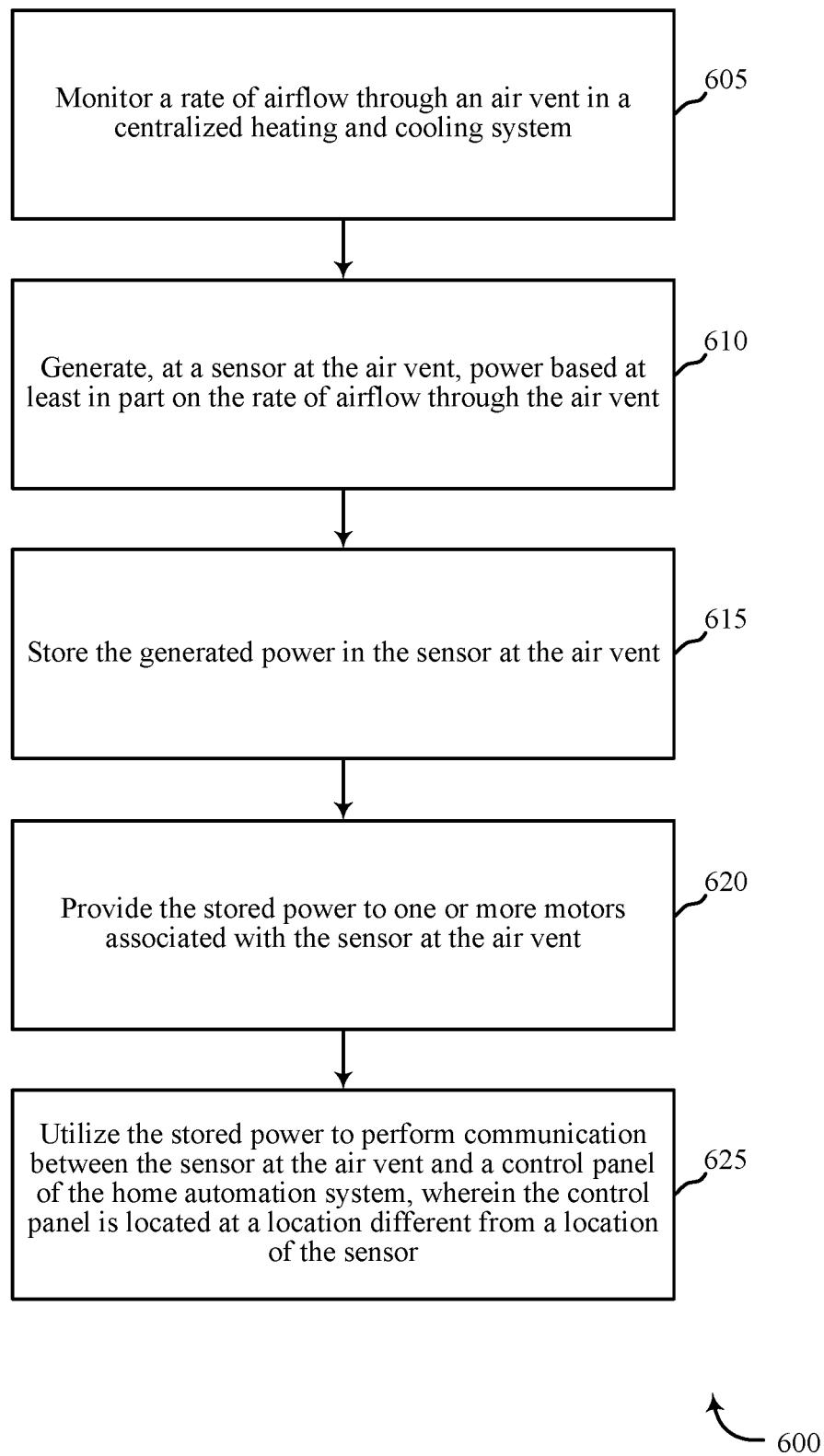
FIG. 6 is a flow chart illustrating an example of a method relating to a security and automation system, in accordance with one or more aspects of the present disclosure.

FIG. 6 is a flow chart illustrating an example of a method 600 relating to a security and/or an automation system, in accordance with one or more aspects of the present disclosure. For clarity, the method 600 is described below with reference to aspects of one or more of the sensor units 110, local computing device 120, control panel 135, and/or remote computing device 140 as described with reference to at least FIG. 1. In addition, method 600 is described below with reference to aspects of one or more of the apparatus 205, 205-a, 205-b, or 205-c described with reference to at least FIGS. 2-5. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 605, the method 600 may include monitoring a rate of airflow through an air vent in a centralized heating and cooling system. The operation at block 605 may be performed using the power generation manager 215, control panel 135, sensor units 110, or apparatus 205, described with reference to FIGS. 1-5. In some aspects, the operation at block 605 may be performed, additionally or alternatively, using the airflow component 305 or the airflow component 305-a, described with reference to FIGS. 3 and 4.

At block 610, the method 600 may include generating, at a sensor at the air vent, power based at least in part on the rate of airflow through the air vent. The operation at block 610 may be performed using the power generation manager 215, control panel 135, sensor units 110, or apparatus 205, described with reference to FIGS. 1-5. In some aspects, the operation at block 610 may be performed, additionally or alternatively, using the airflow component 305 or the airflow component 305-a, described with reference to FIGS. 3 and 4.

At block 615, the method 600 may include storing the generated power in the sensor at the air vent. The operation at block 615 may be performed using the power generation manager 215, control panel 135, sensor units 110, or apparatus 205, described with reference to FIGS. 1-5. In some aspects, the operation at block 615 may be performed, additionally or alternatively, using the storage component 310 or the storage component 310-a, described with reference to FIGS. 3 and 4.

At block 620, the method 600 may include providing the stored power to one or more motors associated with the sensor at the air vent. The operation at block 620 may be performed using the power generation manager 215, control panel 135, sensor units 110, or apparatus 205, described with reference to FIGS. 1-5. In some aspects, the operation at block 620 may be performed, additionally or alternatively, using the storage component 310 or the storage component 310-a, described with reference to FIGS. 3 and 4.

At block 625, the method 600 may include utilizing the stored power to perform communication between the sensor at the air vent and a control panel of the home automation system, wherein the control panel is located at a location different from a location of the sensor. The operation at block 625 may be performed using the power generation manager 215, control panel 135, sensor units 110, or apparatus 205, described with reference to FIGS. 1-5. In some aspects, the operation at block 625 may be performed, additionally or alternatively, using the storage component 310 or the storage component 310-a, described with reference to FIGS. 3 and 4.

Figure 7:
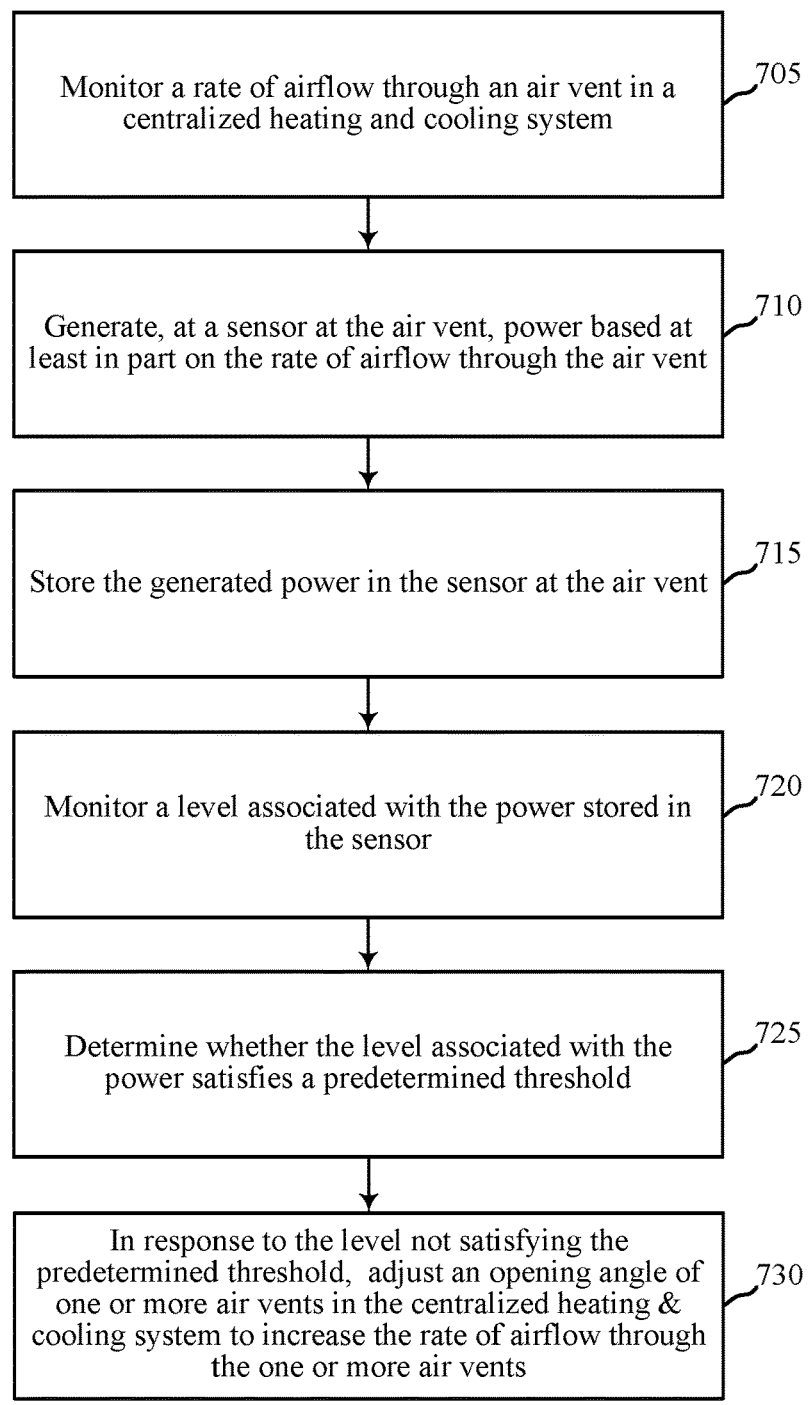
FIG. 7 is a flow chart illustrating an example of a method relating to a security and automation system, in accordance with one or more aspects of the present disclosure.

FIG. 7 is a flow chart illustrating an example of a method 700 relating to a security and automation system, in accordance with one or more aspects of the present disclosure. For clarity, the method 700 is described below with reference to aspects of one or more of the sensor units 110, local computing device 120, control panel 135, and/or remote computing device 140 as described with reference to at least FIG. 1. In addition, method 700 is described below with reference to aspects of one or more of the apparatus 205, 205-a, 205-b, or 205-c described with reference to at least FIGS. 2-5. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 705, the method 700 may include monitoring a rate of airflow through an air vent in a centralized heating and cooling system. The operation at block 705 may be performed using the power generation manager 215, control panel 135, sensor units 110, or apparatus 205, described with reference to FIGS. 1-5. In some aspects, the operation at block 705 may be performed, additionally or alternatively, using the airflow component 305 or the airflow component 305-a, described with reference to FIGS. 3 and 4.

At block 710, the method 700 may include generating, at a sensor at the air vent, power based at least in part on the rate of airflow through the air vent. The operation at block 710 may be performed using the power generation manager 215, control panel 135, sensor units 110, or apparatus 205, described with reference to FIGS. 1-5. In some aspects, the operation at block 710 may be performed, additionally or alternatively, using the airflow component 305 or the airflow component 305-a, described with reference to FIGS. 3 and 4.

At block 715, the method 700 may include storing the generated power in the sensor at the air vent. The operation at block 715 may be performed using the power generation manager 215, control panel 135, sensor units 110, or apparatus 205, described with reference to FIGS. 1-5. In some aspects, the operation at block 715 may be performed, additionally or alternatively, using the storage component 310 or the storage component 310-a, described with reference to FIGS. 3 and 4.

At block 720, the method 700 may include monitoring a level associated with the power stored in the sensor. The operation at block 720 may be performed using the power generation manager 215, control panel 135, sensor units 110, or apparatus 205, described with reference to FIGS. 1-5. In some aspects, the operation at block 720 may be performed, additionally or alternatively, using the power level component 315 or the power level component 315-a, described with reference to FIGS. 3 and 4.

At block 725, the method 700 may include determining whether the level associated with the power satisfies a predetermined threshold. The operation at block 725 may be performed using the power generation manager 215, control panel 135, sensor units 110, or apparatus 205, described with reference to FIGS. 1-5. In some aspects, the operation at block 725 may be performed, additionally or alternatively, using the power level component 315 or the power level component 315-a, described with reference to FIGS. 3 and 4.

At block 730, the method 700 may include in response to the level not satisfying the predetermined threshold, adjusting an opening angle of one or more air vents in the centralized heating & cooling system to increase the rate of airflow through the one or more air vents. The operation at block 730 may be performed using the power generation manager 215, control panel 135, sensor units 110, or apparatus 205, described with reference to FIGS. 1-5. In some aspects, the operation at block 730 may be performed, additionally or alternatively, using the opening angle component 405, described with reference to FIG. 4.

Figure 8:
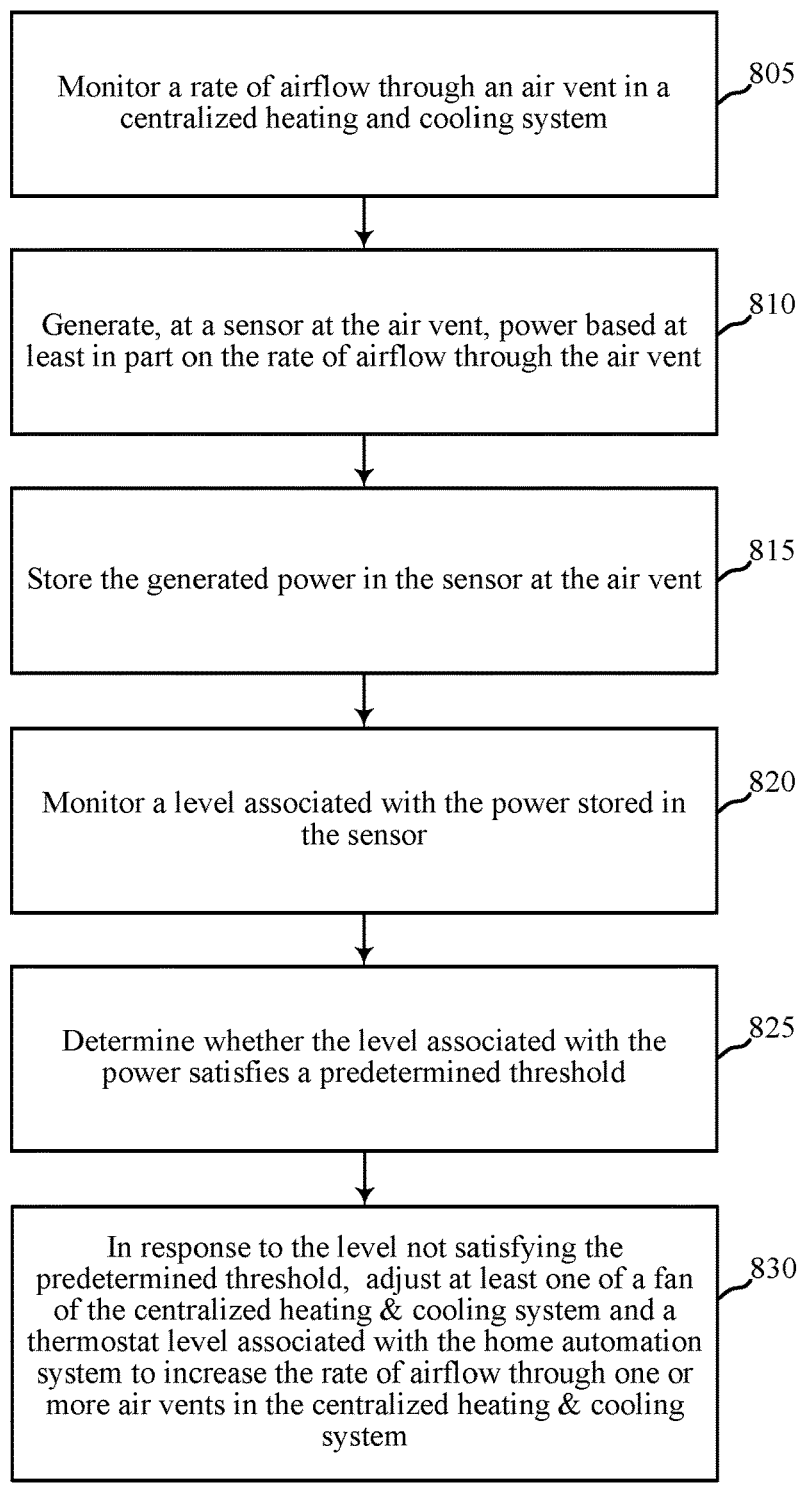
FIG. 8 is a flow chart illustrating an example of a method relating to a security and automation system, in accordance with one or more aspects of the present disclosure.

FIG. 8 is a flow chart illustrating an example of a method 800 relating to a security and/or an automation system, in accordance with one or more aspects of the present disclosure. For clarity, the method 800 is described below with reference to aspects of one or more of the sensor units 110, local computing device 120, control panel 135, and/or remote computing device 140 as described with reference to at least FIG. 1. In addition, method 800 is described below with reference to aspects of one or more of the apparatus 205, 205-a, 205-b, or 205-c described with reference to at least FIGS. 2-5. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 805, the method 800 may include monitoring a rate of airflow through an air vent in a centralized heating and cooling system. The operation at block 805 may be performed using the power generation manager 215, control panel 135, sensor units 110, or apparatus 205, described with reference to FIGS. 1-5. In some aspects, the operation at block 805 may be performed, additionally or alternatively, using the airflow component 305 or the airflow component 305-a, described with reference to FIGS. 3 and 4.

At block 810, the method 800 may include generating, at a sensor at the air vent, power based at least in part on the rate of airflow through the air vent. The operation at block 810 may be performed using the power generation manager 215, control panel 135, sensor units 110, or apparatus 205, described with reference to FIGS. 1-5. In some aspects, the operation at block 810 may be performed, additionally or alternatively, using the airflow component 305 or the airflow component 305-*a*, described with reference to FIGS. 3 and 4.

At block 815, the method 800 may include storing the generated power in the sensor at the air vent. The operation at block 815 may be performed using the power generation manager 215, control panel 135, sensor units 110, or apparatus 205, described with reference to FIGS. 1-5. In some aspects, the operation at block 815 may be performed, additionally or alternatively, using the storage component 310 or the storage component 310-*a*, described with reference to FIGS. 3 and 4.

At block 820, the method 800 may include monitoring a level associated with the power stored in the sensor. The operation at block 820 may be performed using the power generation manager 215, control panel 135, sensor units 110, or apparatus 205, described with reference to FIGS. 1-5. In some aspects, the operation at block 820 may be performed, additionally or alternatively, using the power level component 315 or the power level component 315-*a*, described with reference to FIGS. 3 and 4.

At block 825, the method 800 may include determining whether the level associated with the power satisfies a predetermined threshold. The operation at block 825 may be performed using the power generation manager 215, control panel 135, sensor units 110, or apparatus 205, described with reference to FIGS. 1-5. In some aspects, the operation at block 825 may be performed, additionally or alternatively, using the power level component 315 or the power level component 315-*a*, described with reference to FIGS. 3 and 4.

At block 830, the method 800 may include in response to the level not satisfying the predetermined threshold, adjusting at least one of a fan of the centralized heating & cooling system and a thermostat level associated with the home automation system to increase the rate of airflow through one or more air vents in the centralized heating & cooling system. The operation at block 830 may be performed using the power generation manager 215, control panel 135, sensor units 110, or apparatus 205, described with reference to FIGS. 1-5. In some aspects, the operation at block 830 may be performed, additionally or alternatively, using the opening angle component 405, described with reference to FIG. 4.

In some examples, aspects from two or more of the methods 600, 700, and 800 may be combined and/or separated. It should be noted that the methods 600, 700, and 800 are just example implementations, and that the operations of the methods 700-800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a home automation system, comprising:
   monitoring a rate of airflow through an air vent in a centralized heating and cooling system;
   storing, at a first type of sensor at the air vent, power generated using the airflow through the air vent;
   determining that a second type of sensor is coupled to the first type of sensor and located within a threshold distance from the first type of sensor;
   determining that a portion of the stored power is insufficient to power the second type of sensor for a threshold duration;
   adjusting a thermostat level associated with the home automation system in response to determining that the portion of the stored power at the first type of sensor is insufficient to power the second type of sensor for the threshold duration; and
   transmitting the portion of the stored power to the second type of sensor based at least in part on adjusting the thermostat level.

2. The method of claim 1, comprising:
   providing the stored power to one or more motors associated with the first type of sensor at the air vent; and
   utilizing the stored power to perform communication between the first type of sensor at the air vent and a control panel of the home automation system, wherein the control panel is located at a location different from a location of the first type of sensor.

3. The method of claim 1, comprising:
   monitoring a level associated with the power stored in the first type of sensor; and
   determining whether the level associated with the power satisfies a predetermined threshold.

4. The method of claim 3, comprising:
   in response to the level not satisfying the predetermined threshold, adjusting an opening angle of one or more air vents in the centralized heating & cooling system to increase the rate of airflow through the one or more air vents.

5. The method of claim 3, comprising:
   in response to the level not satisfying the predetermined threshold, adjusting at least one of a fan of the centralized heating & cooling system associated with the home automation system to increase the rate of airflow through one or more air vents in the centralized heating & cooling system.

6. The method of claim 1, wherein the first type of sensor at the air vent includes at least one of a motion sensor, a camera sensor, a shock sensor, a proximity sensor, an appliance sensor, a temperature sensor, a humidity sensor, a light beam sensor, a smoke sensor, a glass break sensor, and a carbon monoxide sensor.

7. The method of claim 1, comprising:
   storing the generated power in one or more rechargeable batteries associated with the first type of sensor at the air vent.

8. The method of claim 1, comprising:
   using one or more sensors at the air vent to determine whether a home is occupied; and
   adjusting the one or more sensors at the air vent to a conservation level in response to determining that the home has no occupancy.

9. The method of claim 8, comprising:
   generating a schedule reflecting occupancy of the home; and
   adjusting the one or more sensors at the air vent to the conservation level based at least in part on the schedule.

10. An apparatus for security and/or automation systems, comprising:
a processor;
memory in electronic communication with the processor; and
instructions stored in the memory, the instructions being executable by the processor to perform the steps of:
monitoring a rate of airflow through an air vent in a centralized heating and cooling system;
storing, at a first type of sensor at the air vent, power generated using the rate of airflow through the air vent;
determining that a second type of sensor is coupled to the first type of sensor and located within a threshold distance from the first type of sensor;
determining that a portion of the stored power is insufficient to power the second type of sensor for a threshold duration;
adjusting a thermostat level associated with a home automation system in response to determining that the portion of the stored power at the first type of sensor is insufficient to power the second type of sensor for the threshold duration; and
transmitting the portion of the stored power to the second type of sensor based at least in part on adjusting the thermostat level.

11. The apparatus of claim 10, the instructions being executable by the processor to perform the steps of:
providing the stored power to one or more motors associated with the first type of sensor at the air vent; and
utilizing the stored power to perform communication between the first type of sensor at the air vent and a control panel of the home automation system, wherein the control panel is located at a location different from a location of the first type of sensor.

12. The apparatus of claim 10, the instructions being executable by the processor to perform the steps of:
monitoring a level associated with the power stored in the first type of sensor; and
determining whether the level associated with the power satisfies a predetermined threshold.

13. The apparatus of claim 12, the instructions being executable by the processor to perform the steps of:
in response to the level not satisfying the predetermined threshold, adjusting an opening angle of one or more air vents in the centralized heating & cooling system to increase the rate of airflow through the one or more air vents.

14. The apparatus of claim 12, the instructions being executable by the processor to perform the steps of:
in response to the level not satisfying the predetermined threshold, adjusting at least one of a fan of the centralized heating & cooling system associated with the home automation system to increase the rate of airflow through one or more air vents in the centralized heating & cooling system.

15. The apparatus of claim 10, wherein the first type of sensor at the air vent includes at least one of a motion sensor, a camera sensor, a shock sensor, a proximity sensor, an appliance sensor, a temperature sensor, a humidity sensor, a light beam sensor, a smoke sensor, a glass break sensor, and a carbon monoxide sensor.

16. The apparatus of claim 10, the instructions being executable by the processor to perform the steps of:
storing the generated power in one or more rechargeable batteries associated with the first type of sensor at the air vent.

17. The apparatus of claim 10, the instructions being executable by the processor to perform the steps of:
using one or more sensors at the air vent to determine whether a home is occupied; and
adjusting the one or more sensors at the air vent to a conservation level in response to determining that the home has no occupancy.

18. The apparatus of claim 17, the instructions being executable by the processor to perform the steps of:
generating a schedule reflecting occupancy of the home; and
adjusting the one or more sensors at the air vent to the conservation level based at least in part on the schedule.

19. A non-transitory computer-readable medium storing computer-executable code, the code executable by a processor to perform the steps of:
monitoring a rate of airflow through an air vent in a centralized heating & cooling system;
storing, at a first type of sensor at the air vent, power generated using the airflow through the air vent;
determining that a second type of sensor is coupled to the first type of sensor and located within a threshold distance from the first type of sensor;
determining that a portion of the stored power is insufficient to power the second type of sensor for a threshold duration;
adjusting a thermostat level associated with a home automation system in response to determining that the portion of the stored power at the first type of sensor is insufficient to power the second type of sensor for the threshold duration; and
transmitting the portion of the stored power to the second type of sensor based at least in part on adjusting the thermostat level.

20. The non-transitory computer-readable medium of claim 19, the code executable by the processor to perform the steps of:
providing the stored power to one or more motors associated with the first type of sensor at the air vent; and
utilizing the stored power to perform communication between the first type of sensor at the air vent and a control panel of the home automation system, wherein the control panel is located at a location different from a location of the first type of sensor.

* * * * *